US012598481B2

(12) United States Patent
Xu et al.

(10) Patent No.: US 12,598,481 B2
(45) Date of Patent: Apr. 7, 2026

(54) REMOTE DEVICE AND 5G DISTRIBUTED SYSTEM

(71) Applicants:PROSE TECHNOLOGIES (SUZHOU) CO., LTD., Suzhou (CN); PROSE TECHNOLOGIES LLC, Mount Olive, NJ (US)

(72) Inventors: Lei Xu, Suzhou (CN); Haijun Min, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 330 days.

(21) Appl. No.: 18/349,514

(22) Filed: Jul. 10, 2023

(65) Prior Publication Data

US 2023/0354053 A1 Nov. 2, 2023

Related U.S. Application Data

(63) Continuation of application No. PCT/CN2022/076742, filed on Feb. 18, 2022.

(30) Foreign Application Priority Data

Apr. 16, 2021 (CN) .......................... 202110413670.6

(51) Int. Cl.
H04W 16/20 (2009.01)
(52) U.S. Cl.
CPC .................................... H04W 16/20 (2013.01)

(58) Field of Classification Search
CPC ...................................................... H04W 16/20
See application file for complete search history.

(56) References Cited

U.S. PATENT DOCUMENTS 10,440,584 B1 * 10/2019 Labadie ................... H03H 7/12
2022/0007346 A1 * 1/2022 Ma ....................... H04W 72/046

FOREIGN PATENT DOCUMENTS

CN 102307064 A 1/2012
CN 108390702 A 8/2018
(Continued)

OTHER PUBLICATIONS

World Intellectual Property Organization (WIPO) International Search Report for PCT/CN2022/076742 May 13, 2022 7 pages (with translation).

*Primary Examiner* — Michael T Vu
(74) *Attorney, Agent, or Firm* — ANOVA LAW GROUP, PLLC

(57) ABSTRACT

A 5G distributed system includes a near-end unit, a remote device, and an active antenna unit. The near-end unit transmits signals of multiple modes including 5G signal to the remote device. The remote device performs frequency conversion processing on 5G signal and does not perform frequency conversion processing on signals of other modes, such as 4G, and then outputs to the active antenna unit for coverage. In the present disclosure, the 5G signal is converted by frequency conversion at the remote device, and signals of other modes other than 5G signal are transmitted to the remote active antenna unit without being processed by frequency conversion for signal coverage, which satisfies the coverage requirements of 5G indoor distribution.

16 Claims, 8 Drawing Sheets

(56)　　　　　　References Cited

FOREIGN PATENT DOCUMENTS

| CN | 111313939 | A | 6/2020 |
| CN | 111770506 | A | 10/2020 |
| CN | 211830769 | U | 10/2020 |
| CN | 113055899 | A | 6/2021 |

* cited by examiner

BTS_SISO

BTS_MIMO

101

102

1020

1022

1024

1026

103

REMOTE DEVICE AND 5G DISTRIBUTED SYSTEM

RELATED APPLICATIONS

This application is a continuation application of PCT Patent Application No. PCT/CN2022/076742, filed on Feb. 18, 2022, which claims priority to Chinese Patent Application No. 202110413670.6 filed with the National Intellectual Property Administration, People's Republic of China on Apr. 16, 2021, all of which are incorporated herein by reference in entirety.

FIELD OF THE TECHNOLOGY

The present disclosure relates to a field of mobile communication, in particular to a remote device and a 5G distributed system.

BACKGROUND

As scientific technologies grow, 5G applications are gradually entering people's work and life, and service requirements promote the development of networks. The main features of 5G networks are larger bandwidth, lower latency, and more connections. In order to obtain larger bandwidth, higher C-band and millimeter waves are introduced into indoor 5G networks. Higher frequencies need greater transmission power. Insufficient indoor coverage may be caused by the use of traditional 4G networking method.

Certain indoor distribution systems have been deployed during the 3G and 4G network infrastructure construction indoor. The indoor distribution systems consist of high-power signal sources, combiners, power splitter, feeder lines, and antennas, which have the advantage of low cost and high reliability.

However, certain existing indoor distribution system has the following shortcomings: 1. it is inconvenient to upgrade and expand the 5G hardware capacity in the future because of being limited by the selection of power amplifiers at the back end of the radio frequency, which may easily lead to the increase of potential cost; 2. it cannot meet coverage requirements of 5G indoor distribution systems because of being limited by the output power of the remote coverage unit.

SUMMARY

The purpose of the present disclosure is to overcome the defects of the prior art and provide a remote device and a 5G distributed system.

In order to achieve the above mentioned goal, the present disclosure provides the following technical solution: a remote device, including a remote unit including at least one remote non-frequency-conversion processing unit and at least one remote frequency conversion processing unit, the remote frequency conversion processing unit configured to perform frequency conversion processing or restoration frequency conversion processing on a first signal and output the processed first signal, and the first signal including 5G signal, the remote non-frequency-conversion processing unit configured to directly output a second signal without be processed by frequency conversion, and the second signal including any combination of one or more of 2G signal, 3G signal, and 4G signal.

In certain embodiment(s), the remote frequency conversion processing unit includes at least one 5G remote processing unit. In some embodiments, each of the at least one 5G remote processing unit includes a 5G remote downlink processing unit, a 5G remote uplink processing unit and a first switching unit, the 5G remote downlink processing unit is configured to perform frequency conversion processing on a 5G downlink radio frequency signal and then output the processed 5G downlink radio frequency signal to the first switching unit, the 5G remote uplink processing unit is configured to restore frequency conversion processing on the 5G uplink radio frequency signal transmitted by the first switching unit and then output the restored signal, the first switching unit is configured to switch the upper and lower radio frequency signals.

In certain embodiment(s), each of the 5G remote downlink processing unit and the 5G remote uplink processing unit includes a 5G converter and a 5G adjustment unit connected to the 5G converter, the 5G adjustment unit of the 5G remote downlink processing unit is connected to the first switching unit, and the 5G converter of the 5G remote uplink processing unit is connected to the first switching unit.

In certain embodiment(s), the 5G remote downlink processing unit further includes a synchronization module, the synchronization module includes a coupler and a synchronization unit, and the coupler is connected to the 5G converter of the 5G remote downlink processing unit, one end of the synchronization unit is connected to the coupler, and the other end of the synchronization unit is connected to the first switching unit, the coupler couples 5G downlink signals to the synchronization unit to control the first switching unit.

In certain embodiment(s), the 5G converter (also called 5G down-converter) of the 5G remote downlink processing unit and the 5G converter (also called 5G up-converter) of the 5G remote uplink processing unit are both connected to a same frequency providing unit for providing a local oscillator frequency, or respectively connected to different frequency providing units for providing the local oscillator frequency.

In certain embodiment(s), the 5G adjustment unit includes a 5G remote first amplifier, a 5G remote second amplifier, and a first signal adjuster connected between the 5G remote first amplifier and the 5G remote second amplifier connected in series in sequence.

In certain embodiment(s), the non-frequency-conversion processing unit includes any combination of one or more 4G remote processing units, one or more 3G remote processing units, or one or more 2G remote processing units. Each of the 4G remote processing unit, 3G remote processing unit, and 2G remote processing unit includes a remote downlink processing unit, a remote uplink processing unit, and a second switching unit, and the remote downlink processing unit is configured to perform frequency conversion processing on the downlink second signal and output the processed downlink second signal to the second switching unit, the remote uplink processing unit is configured to restore frequency conversion processing on the uplink second signal transmitted from the second switching unit and output the restored signal, the second switching unit is configured to switch the uplink and downlink second signals.

In certain embodiment(s), the remote device further includes a first transmission module and a first multi-frequency combiner, and the first transmission module is connected to one end of the remote unit to transmit radio frequency signals, the first multi-frequency combiner is connected to the other end of the remote unit to split or combine the radio frequency signals.

In certain embodiment(s), the remote device further includes a remote power supply unit for supplying power to the remote unit, and the remote power supply unit is connected to the first multi-frequency.

In certain embodiment(s), the remote supply unit is disposed outside the remote unit or the remote supply unit is integrated in the remote unit.

In certain embodiment(s), the remote device further includes a passive network unit, and when the remote supply unit is disposed outside the remote unit, the passive network unit is connected to the remote supply unit, and when the remote power supply unit is built in the remote unit, the passive network unit is connected to the first multi-frequency combiner.

In certain embodiment(s), the first switching unit and the second switching unit are implemented by radio frequency switches and/or duplexers.

In addition, the present disclosure discloses a 5G distributed system, including a near-end unit, the remote device according to the above mentioned embodiment, and an active antenna unit, the near-end unit connected to the remote device, and the active antenna unit connected to the remote device for performing restoration frequency conversion processing on the first signal output by the remote device (e.g., when the first signal output by the remote device is the processed first signal obtained after the remote frequency conversion processing unit performing frequency conversion processing) and outputting the restored signal to an antenna, or performing frequency conversion processing on the first signal input from the antenna and outputting the processed first signal to the remote device (e.g., the processed first signal may then be processed by the remote frequency conversion processing unit by performing restoration frequency conversion processing), and directly output the second signal received from the antenna or received from the remote device without being processed by frequency conversion.

In certain embodiment(s), the active antenna unit includes a second multi-frequency combiner, at least one active frequency conversion processing unit and at least one antenna, and the second multi-frequency combiners are connected to the remote device, and the antenna is indirectly connected to the second multi-frequency combiner through the active frequency conversion processing unit, and is directly connected to the second multi-frequency combiner, the first signal transmitted from the remote device is processed by the active frequency conversion processing unit and then output to one or more antenna of the at least one antenna, and the second signal transmitted from the remote device is directly output from one or more antenna of the at least one antenna without being processed by frequency conversion.

In certain embodiment(s), the active frequency conversion processing unit includes a first switch, an active downlink processing unit, an active uplink processing unit, and a second switch, the first switch is connected to the second multi-frequency combiner, the active downlink processing unit and the active uplink processing unit are connected in parallel between the first switch and the second switch, and the second switch is connected to the antenna.

The Beneficial Effects of the Present Disclosure are as Follows:

1. The distributed system of the present disclosure is an analog system. Compared with a digital system, the transmission bandwidth is not limited by the transmission rate, and the remote unit of the distributed system converts the signal in 5G network into a certain frequency and then transmits the converted signal to the active antenna unit, which promotes upgrade and expansion of 5G hardware, meets coverage requirements of 5G indoor distribution systems, and supports no frequency conversion for other standard signals in 4G networks.

2. The three level architecture used in the system of the present disclosure, including a near-end unit, a remote device and an active antenna unit can achieve the effect of extending the transmission coverage of the information source.

DETAILED DESCRIPTION

The technical solutions of the embodiment(s) of the present disclosure are described below in conjunction with the accompanying drawings of the present disclosure.

The present disclosure discloses a remote device and a 5G distributed system, 5G signals are transmitted to a remote active antenna unit after frequency conversion processing at the remote device, and signals of other standards other than 5G signals are directly transmitted to the remote active antenna unit for realizing signal coverage without frequency conversion processing, which meets the coverage requirements of 5G indoor distribution.

Figure 1:
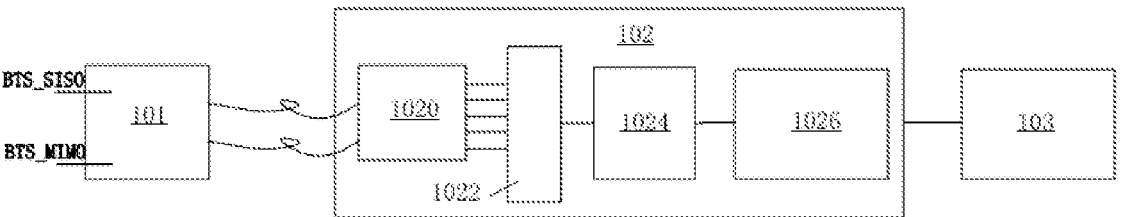
FIG. 1 is schematic structural diagram of a 5G distributed system according to certain embodiment(s) of the present disclosure.

As shown in FIG. 1, the 5G distributed system disclosed in embodiment 1 of the present disclosure includes a near-end unit (MU) 101, a remote device 102, and an active antenna unit 103, where the near-end unit 101 is connected to the base station transceiver (BTS), the base station transceiver receives or transmits SISO (Single Input Single Output) signals and/or MIMO (Multiple Input Multiple Output) signals, including but not limited to 2G signals, 3G signals, 4G signals and 5G signals, such as public network mobile communications, private network mobile communications, cable service, IoT service, digital TV. The invention covers the signal source access in the frequency range of 300 M~6000 MHz.

Figure 2:
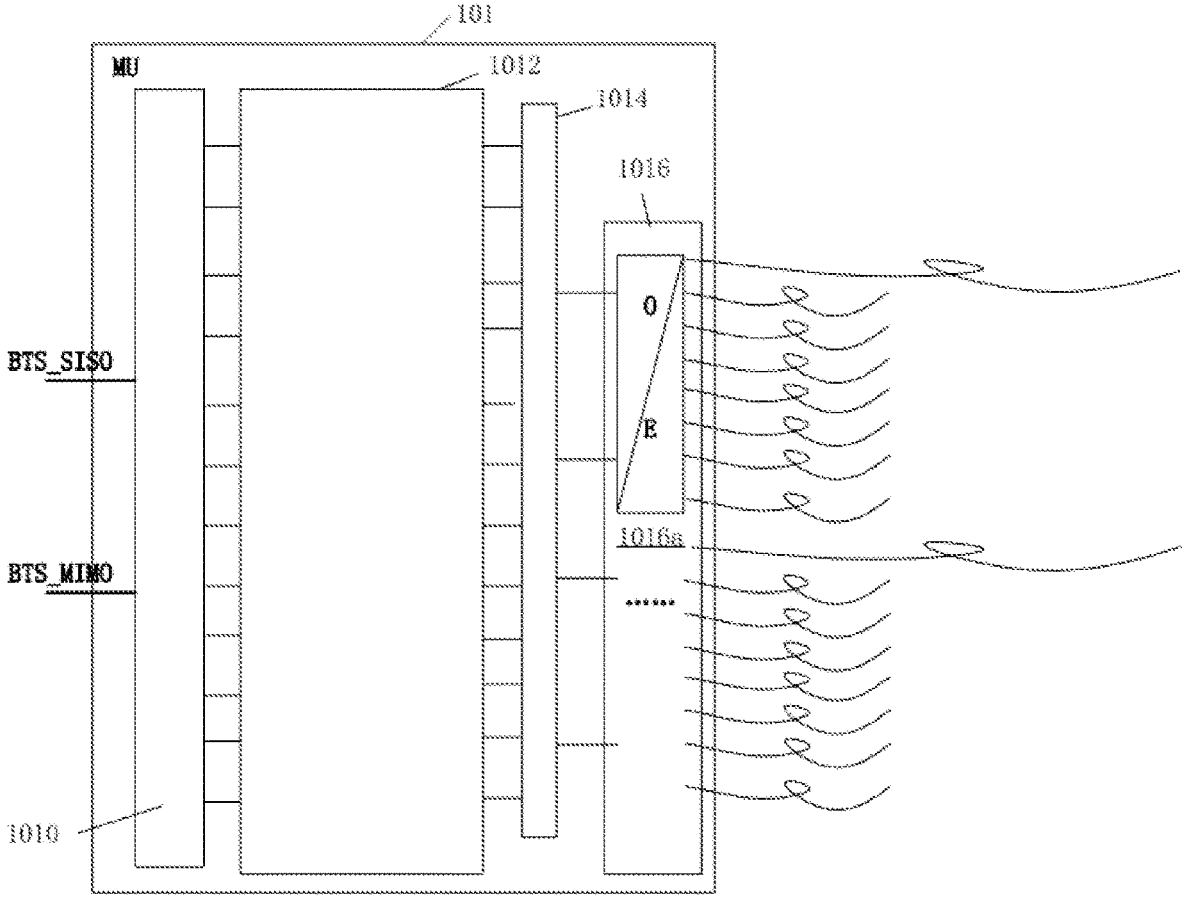
FIG. 2 is a schematic structural diagram of a near-end unit according to certain embodiment(s) of the present disclosure.

As shown in FIG. 2, the near-end unit 101 of this embodiment includes a third multi-frequency combiner 1010, a near-end signal processing unit 1012, a combiner unit 1014, and a second transmission module 1016, where the third multi-frequency combiner 1010 is used for receiving or transmitting SISO signals and/or MIMO signals. In other embodiment(s), the near-end unit may not be provided with a third multi-frequency combiner, and signals transmitted by the BTS may be directly input into corresponding near-end signal processing units.

The near-end signal processing unit 1012 includes a near-end non-frequency-conversion processing unit and a near-end frequency conversion processing unit. The near-end non-frequency-conversion processing unit includes any combination of one or more 2G near-end processing units, one or more 3G near-end processing units, or one or more 4G near-end processing units, such as several 2G near-end processing units, one 3G near-end processing unit and two 4G near-end processing units, or one 2G, two 3G, and one 4G near-end processing units, etc. The near-end frequency conversion processing unit includes several 5G near-end processing units. The near-end non-frequency-conversion processing unit is configured to output standards other than 5G signals directly without performing frequency conversion on them; the near-end frequency conversion processing unit is configured to perform frequency conversion processing on 5G signals and output them. In this embodiment, for the near-end signal processing unit, the structure of the 5G near-end processing unit is substantially the same as those of 2G near-end processing units, 3G near-end processing units, and 4G near-end processing units, while there are differences in performance parameters of the internal function modules.

In one embodiment, a 4G near-end processing unit may include a 4G single-input single-output near-end unit and/or a 4G multiple-input multiple-output near-end unit, and a 5G near-end processing unit may include a 5G single-input single-output near-end unit and/or a 5G multiple-input multiple-output near-end unit, and the internal modules of the 4G single-input single-output near-end unit, the 4G multiple-input multiple-output near-end unit, the 5G single-input single-output near-end unit, the 5G multiple-input multiple-output near-end unit are the same as those of the above-mentioned various near-end processing units, details are not repeated here for brevity.

As shown in FIG. 2, one end of the combiner unit 1014 is connected to the near-end signal processing unit 1012, and the other end of the combiner unit 1014 is connected to the second transmission module 1016, and the combiner unit 1014 is configured to combine the downlink radio frequency signal transmitted from the near-end signal processing unit 1012 and output the combined signal to the second transmission module 1016, or split the uplink radio frequency signal transmitted from the second transmission module 1016 and output the split signal to the near-end signal processing unit 1012. The second transmission module 1016 includes at least one near-end optical module 1016a for receiving or transmitting SISO signals and/or MIMO signals, and performing photoelectric conversion on SISO signals and/or MIMO signals. The present disclosure does not limit the specific structure of the near-end unit, that is, the structure of the near-end unit will not be limited as described in embodiment 1.

Figure 3:
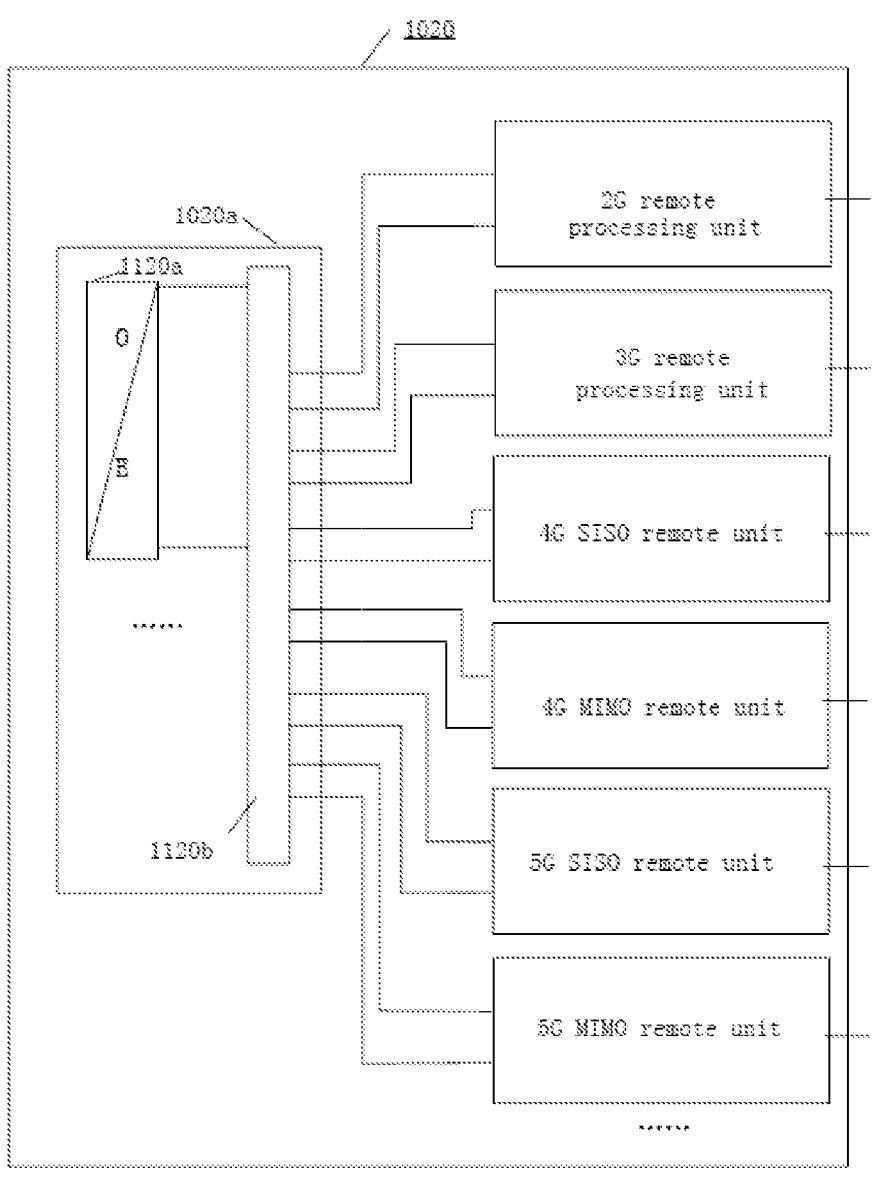
FIG. 3 is a schematic structural diagram of a remote unit according to certain embodiment(s) of the present disclosure.

As shown in FIG. 1, the remote device 102 is connected to the near-end unit 101 for performing frequency conversion processing or restoration frequency conversion processing on 5G signal received from the near-end unit 101 or the active antenna unit 103, and signals of other standards other than 5G signals are directly transmitted to the active antenna unit 103 without being performed frequency conversion unit 103 without being performed frequency conversion processing by the remote device 102, or the near-end unit 101 will directly receive other modes other than 5G signal from the active antenna unit 103 without being performed frequency conversion processing by the remote device 102. In this embodiment 1, the remote device 102 includes a remote unit 1020, a first multi-frequency combiner 1022, a remote power supply unit 1024, and a passive network unit 1026. As shown in FIG. 1 and FIG. 3, one end of the remote unit 1020 is connected to the near-end unit 101, and the other end is connected to the first multi-frequency combiner 1022, which includes a first transmission module 1020a and a remote signal processing unit. The first transmission module 1020a is coupled to the second transmission module 1016 of the near-end unit 101. The first transmission module 1020a includes at least one remote optical module 1120a and a power splitting and combining unit 1120b. Each remote optical module 1020a is connected to a respective near-end optical module 1016a of the near-end unit 101, and is used for performing photoelectric conversion on SISO signals and/or MIMO signals.

The power splitting and combining unit is connected to the remote optical module 1120a, and is configured to split the downlink SISO signals and/or MIMO signals transmitted from the remote optical module 1120a and output the split signals, or combine the uplink radio frequency signals and output the combined signals to the remote optical module 1120a.

In one embodiment, the remote signal processing unit may include multiple signal processing units that process signals of different standards. Specifically, the remote signal processing unit includes a remote frequency conversion processing unit and a remote non-frequency-conversion processing unit. The remote frequency conversion processing unit at least includes several 5G remote processing units for processing 5G signals. In embodiment 1, corresponding to the near-end unit 101, the remote non-frequency-conversion processing unit of the remote unit 102 includes one or more of 2G remote processing unit(s), 3G remote processing unit(s), and 4G remote processing unit(s).

Figure 4:
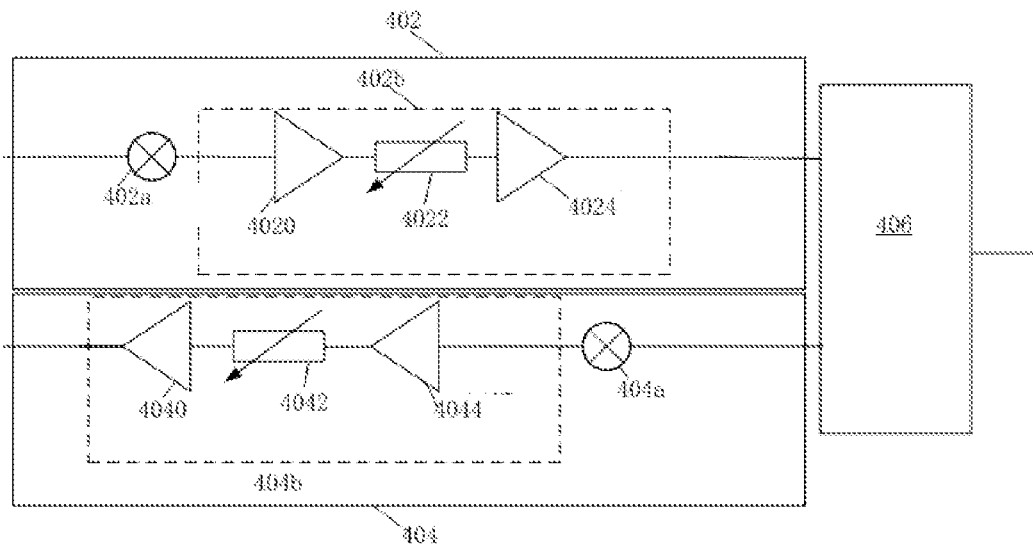
FIG. 4 is a schematic structural diagram of a 5G remote processing unit according to certain embodiment(s) of the present disclosure.

And where, a 5G remote processing unit includes a 5G single input single output remote unit and/or a 5G multiple-input multiple-output remote unit. The internal functional modules of the 5G single-input single-output remote units and the 5G multiple-input multiple-output remote units have the same structure, which each includes a 5G remote downlink processing unit 402, a 5G remote uplink processing unit 404, and a first switching unit 406, as shown in FIG. 4. And where, the 5G remote downlink processing unit 402 includes a 5G down-converter 402a and a 5G downlink adjustment unit 402b, one end of the 5G down-converter 402 a is connected to the power splitting and combining unit 1120b of the first transmission module 1020a, and the other end of the 5G down-converter 402a is connected to one end of the 5G downlink adjustment unit 402b for performing frequency conversion processing on the downlink radio frequency signal transmitted from the first transmission module 1020a; the other end of the 5G downlink adjustment unit 402a is connected to the first switching unit 406 for adjusting the downlink frequency conversion signal. Similarly, the 5G remote uplink processing unit 404 includes a 5G up-converter 404*a* and a 5G uplink adjustment unit 404*b*. One end of the 5G up-converter 404*a* is connected to the first switching unit 406, and the other end of the 5G up-converter 404*a* is connected to one end of the 5G uplink adjustment unit 404*b* to restore the frequency conversion signal transmitted by the first switching unit 406 to an uplink radio frequency signal, and the other end of the 5G uplink adjustment unit 404*b* is connected to the first transmission module 1020*a* (as shown in FIG. 3) for adjusting the uplink radio frequency signal. In this embodiment, the 5G downlink adjustment unit 402*b* includes a 5G remote first amplifier 4020, a first signal adjuster 4022, and a 5G remote second amplifier 4024 connected in series in sequence, and the 5G uplink adjustment unit 404*b* includes a 5G remote second amplifier 4040, a first signal adjuster 4042, and a 5G remote second amplifier 4044 connected in series in sequence. The 5G remote first amplifiers 4020, 4040 and the 5G remote second amplifiers 4024, 4044 are all configured to amplify the link radio frequency signal, the first signal adjusters 4020, 4040 are configured to adjust the size of the uplink and downlink signals respectively. In one embodiment, each of the first signal adjuster 4020, 4040 may be a digital attenuator.

Figure 5:
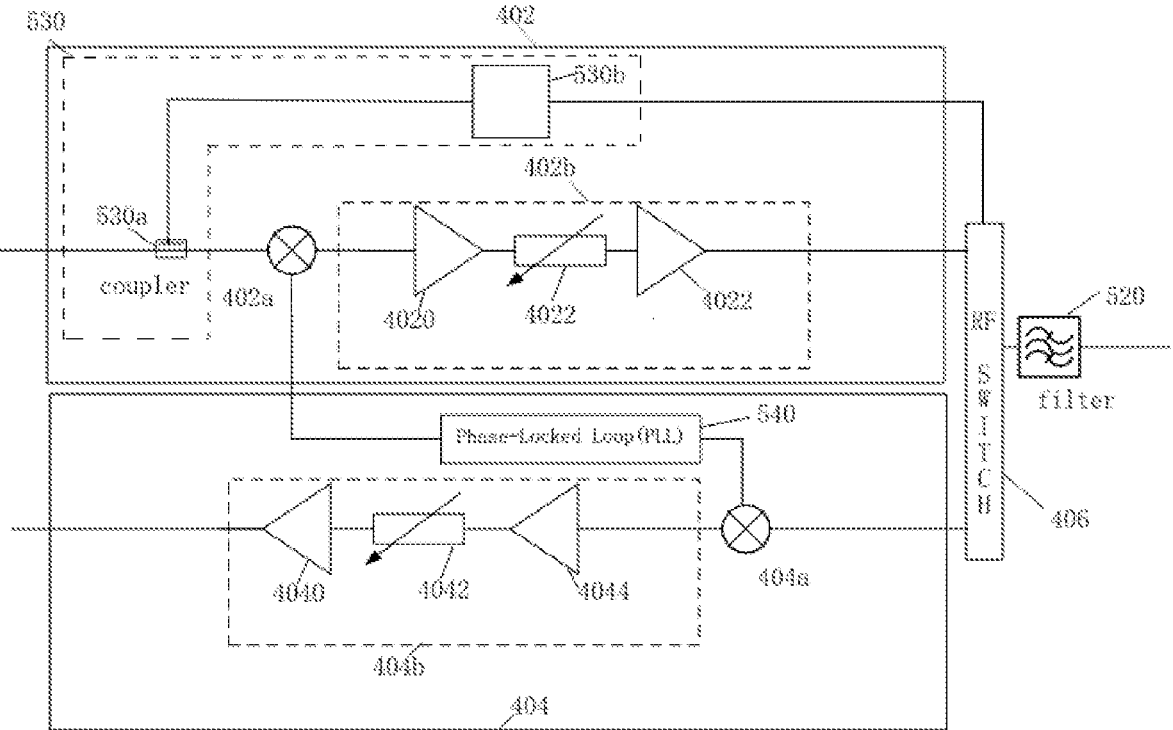
FIG. 5 is a schematic structural diagram of a 5G remote processing unit according to certain embodiment(s) of the present disclosure.

The first switching unit 406 is connected to the first multi-frequency combiner 1022, and is configured to switch the radio frequency signal between uplink and downlink. In this embodiment 1, as shown in FIG. 5, the first switching unit 406 is implemented as a radio frequency switch, which is connected to both the 5G remote downlink processing unit 402 and the 5G remote uplink processing unit 404, and is configured to switch signal between uplink and downlink. The radio frequency switch is also connected in series with a filter 520, which is connected between the radio frequency switch and the first multi-frequency combiner 1022 and is used for filtering the downlink radio frequency signal or the uplink radio frequency signal output by the radio frequency switch.

In certain embodiment(s), as shown in FIG. 5, the 5G remote downlink processing unit 402 further includes a synchronization module 530. The synchronization module 530 includes a coupler 530*a* and a synchronization unit 530*b*. The coupler 530*a* is connected between the 5G down-converter 402*a* and the first transmission module 1020*a*, and one end of the synchronization unit 530*b* is connected to the coupler 530*a*. The other end of the synchronization unit 530*b* is connected to the first switching unit 406, the coupler 530*a* couples 5G downlink signals to the synchronization unit 530*b*, and the synchronization unit 530*b* performs baseband decoding and outputs time slot control signals to perform upper and lower time slot switching control on the radio frequency switch.

In certain embodiment(s), as shown in FIG. 5, the 5G down-converter 402*a* and the 5G up-converter 404*a* are connected to a same frequency providing unit 540 together. The frequency providing unit 540 is configured to provide local oscillators frequency for the 5G down-converter 402*a* and the 5G up-converter 404*a*. In one embodiment, the frequency providing unit 540 is implemented as a phase-locked loop (PLL). In some embodiments, each of the 5G down-converter 402*a* and the 5G up-converter 404*a* are respectively connected to a different frequency providing unit 540.

Figure 6:
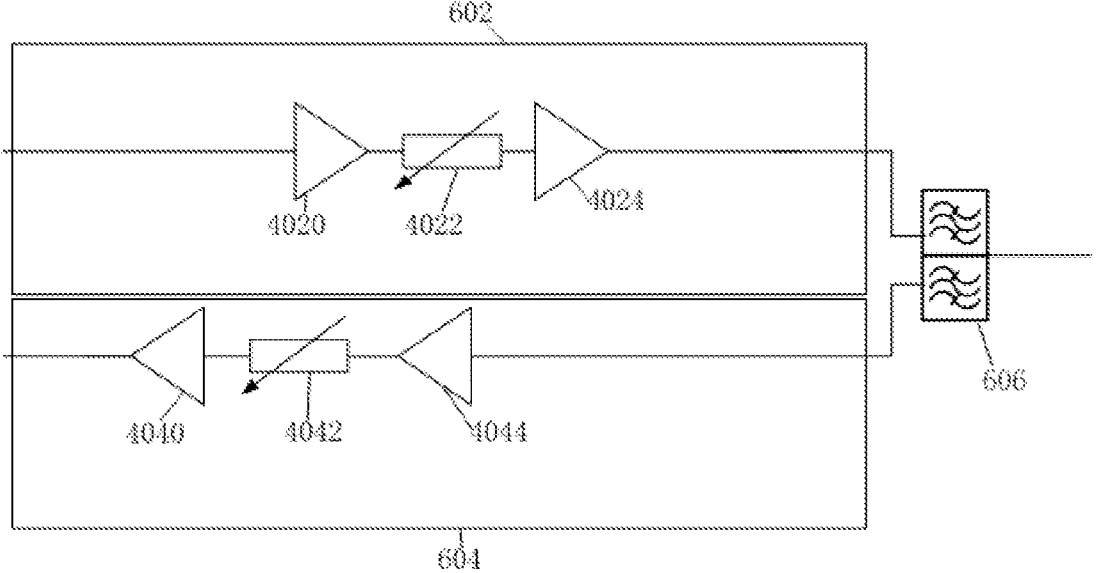
FIG. 6 is a schematic structural diagram of a signal processing unit of other standards of the remote unit according to certain embodiment(s) of the present disclosure.

In Embodiment 1, the 4G remote processing unit also includes a 4G single-input single-output remote unit and/or a 4G multiple-input multiple-output remote unit. In embodiment 1, the 2G remote processing unit, the 3G remote processing unit and the 4G remote processing unit have the same internal functional module structure, as shown in FIG. 6, each including a remote downlink processing unit 602, a remote uplink processing unit 604 and a second switching unit 606, where both ends of the remote downlink processing unit 602 and the remote uplink processing unit 604 are respectively connected to the first transmission module 1020*a* and the second switching unit 606, and the remote downlink processing unit 602 and the remote uplink processing unit 604 are configured to perform adjustment processing on the uplink and downlink signals transmitted from the first transmission module, respectively. The second switching unit 606 is connected to the first multi-frequency combiner 1022, and is configured to isolate and filter the uplink signals and the downlink signals and output them. In this embodiment 1, the second switching unit 606 is implemented using a duplexer. It should be noted that the first switching unit 406 and the second switching unit 606 can be implemented using radio frequency switches and/or duplexers. Generally, 4G and 5G mode signals may use FDD and/or TDD communication modes, and FDD generally uses duplexers, TDD generally uses radio frequency switches.

In this embodiment 1, the remote downlink processing unit 602 include, connected in this order, a remote third amplifier 6020, a second signal adjuster 6022, and a remote fourth amplifier 6024, and the remote uplink processing unit 604 include a remote third amplifier 6040, a second signal adjuster 6042, and a remote fourth amplifier 6044 that are connected in series in sequence, and the remote third amplifiers 6020, 6040 and the remote fourth amplifiers 6024, 6044 are configured to amplify the link radio frequency signal, and the second signal adjusters 6022,6042 are configured to adjust the size of the uplink and downlink signals. In one embodiment, the second signal adjuster may be implemented as a digital attenuator.

The remote power supply unit 1024 is configured to supply power to the remote unit 1020. In embodiment 1, the remote power supply unit 1024 is disposed outside the remote unit 1020. At this time, the remote unit 1020 is connected between the first multi-frequency combiner 1022 and the passive network unit 103, as shown in FIG. 1. In this embodiment, the remote power supply unit 1024 includes a power feeder and a power supply connected to the power feeder.

The passive network unit 1026 is connected to the remote supply unit 1024, and is configured to distribute the front-end signal to different multiple active antenna units 103 through a coupler or a power splitter, so as to achieve the purpose of extending the transmission coverage of the signal source.

Figure 7:
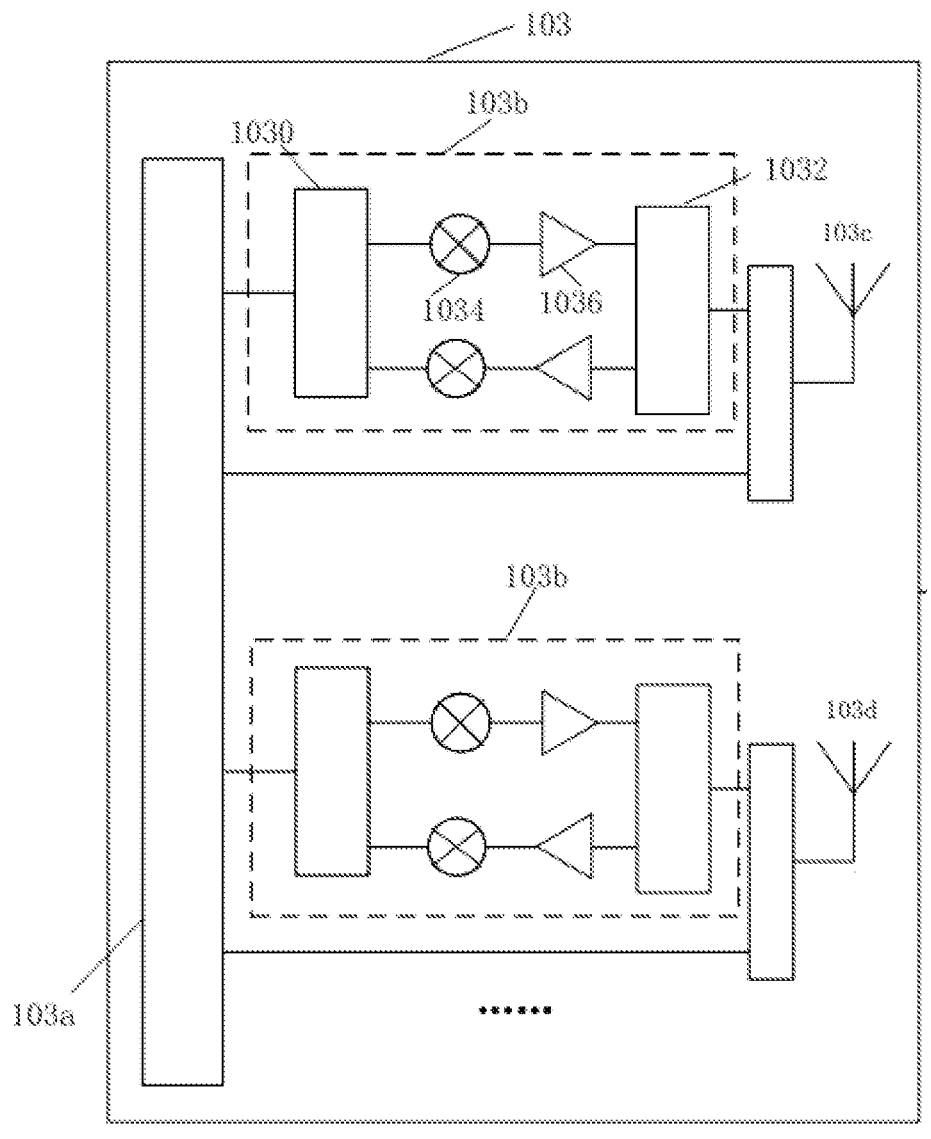
FIG. 7 is a schematic structural diagram of an active antenna unit according to certain embodiment(s) of the present disclosure.

The active antenna unit and the passive network unit are connected through a transmission medium, and are configured to restore the downlink intermediate frequency signal output by the remote device to a radio frequency signal and then output it, or convert the uplink radio frequency signal received into an uplink intermediate frequency signal and send it to the remote device. As shown in FIG. 7, in this embodiment, the active antenna unit 103 includes a second multi-frequency combiner 103*a*, at least one active frequency conversion processing unit 103*b*, and at least one antenna. The second multi-frequency combiner 103*a* is connected to the passive network unit 1026 through the transmission medium, and is used for splitting the signal transmitted by the remote device and outputting it or combining the received signal and outputting the combined signal to the remote device 102.

The active frequency conversion processing unit is configured to perform frequency conversion on or restore signals including 5G signal and output them. In this embodiment 1, each active frequency conversion processing unit 103*b* includes a first switch 1030, an active downlink processing unit, an active uplink processing unit, and a second switch 1032. The first switch 1030 is connected to the second multi-frequency combiner 103*a*, the second switch 1032 is connected to an antenna, and the active downlink processing unit and the active uplink processing unit are connected in parallel between the first switch 1030 and the second switch 1032. Both the active downlink processing unit and the active uplink processing unit include a frequency converter 1034 and an amplifier 1036 connected in series.

In this embodiment, there are two antennas, which are defined as antenna 103*c* and antenna 103*d*. Antenna 103*c* is indirectly connected to the second multi-frequency combiner 103*a* through an active frequency conversion processing unit 103*b*, and is also connected to the second multi-frequency combiner 103*a*. Similarly, the antenna 103*d* is indirectly connected to the second multi-frequency combiner 103*a* through an active frequency conversion processing unit 103*b*, and is also directly connected to the second multi-frequency combiner 103*a*. The 5G signal transmitted from the remote device 103 will output to the antenna 103*c* and/or antenna 103*d* after being restored frequency conversion processing by the active frequency conversion processing unit 103*b*. The signals of other modes transmitted by the remote device are directly output from the antenna 103*c* and/or antenna 103*d* without being processed by frequency conversion.

The working principle of the 5G distributed system of the present disclosure is as follows:

Downlink: The near-end unit receives SISO signals and/or MIMO signals sent by the base station, and after being split by the third multi-frequency combiner, the downlink signals of multiple modes (including 2G to 5G) enter each of respective near-end downlink processing units of various near-end processing units of near-end unit respectively to be sequentially amplified, adjusted, and amplified, and then be combined by the combiner unit and then output to the second transmission module. The second transmission module converts the SISO signals and/or MIMO signals into an optical signal and then output the optical signal to the remote unit. The first transmission module of the remote unit converts the optical signal into an electrical signal and splits the signal and outputs the split signal to the remote non-frequency-conversion processing unit and the remote frequency conversion processing unit. The 5G remote downlink processing unit of the 5G remote processing unit of the remote frequency conversion processing unit performs frequency conversion, amplification, size adjustment, and amplification processing on the 5G signal in sequence, and then outputs the processed signal to the first multi-frequency combiner. The signals of other modes are not processed by frequency conversion and are output to the first multi-frequency combiner by being processed by corresponding signal processing unit. The first multi-frequency combiner transmits the signal to the active antenna unit through the passive network unit. In the active antenna unit, after being split by the second multi-frequency combiner, the 5G signal are output to the active frequency conversion processing unit for restoring frequency conversion and then output through the antenna. The SISO signals and/MIMO signals of other modes are output directly without being processed by frequency conversion.

The working principle of the uplink is opposite to that of the downlink, details are not repeated here for brevity.

Figure 8:
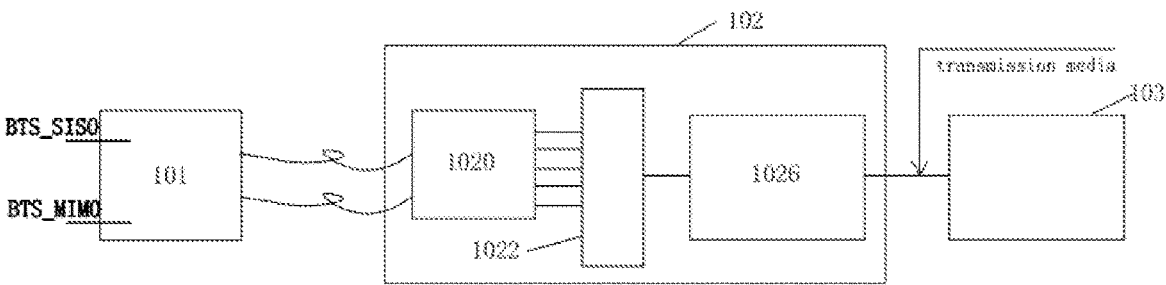
FIG. 8 is a schematic structural diagram of a 5G distributed system according to certain embodiment(s) of the present disclosure.
Figure 9:
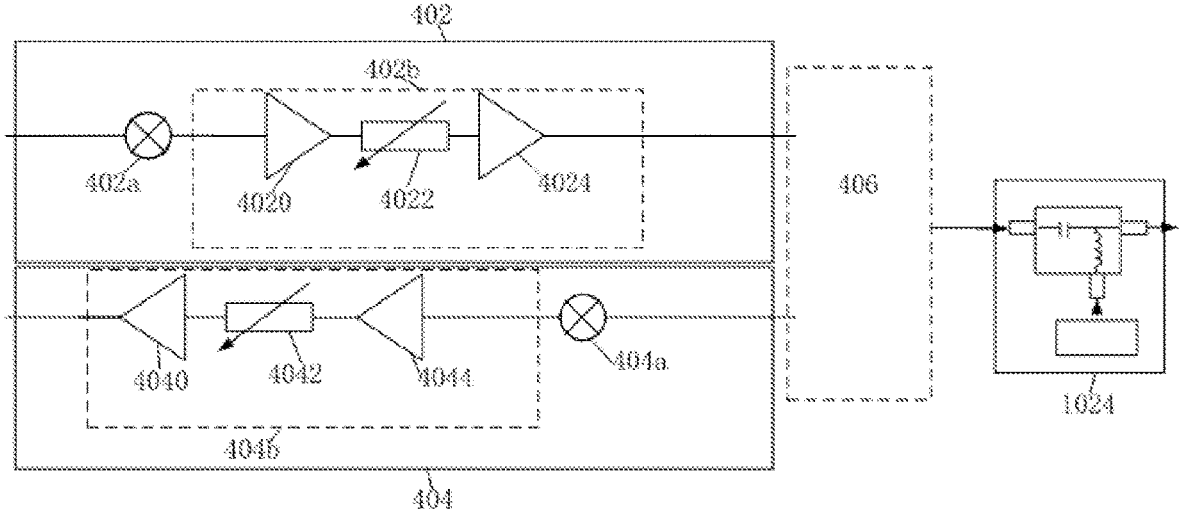
FIG. 9 is a schematic structural diagram of a 5G remote processing unit according to certain embodiment(s) of the present disclosure.

As shown in FIG. 8, it is a 5G distributed system disclosed in embodiment 2 of the present disclosure. The difference from embodiment 1 is that the remote power supply unit is built in the remote unit, eliminating the need for an external remote power supply unit. As shown in FIG. 9, each of the 5G single input single output units and the 5G multiple-input multiple-output units has a remote power supply unit. One end of the remote power supply unit is connected to the first switching unit of the 5G remote processing unit, and the other end of the remote power supply unit is connected to the first multi-frequency combiner. And the remote power supply unit is built-in to improve the overall integration of the remote device. Of course, the signal processing units corresponding to the 5G remote processing unit of other modes can also be provided with a remote supply unit.

In this embodiment 2, the passive network unit 1026 is directly connected to the first multi-frequency combiner 1022. The other structure and working principle of embodiment 2 of the present disclosure are the same as those of embodiment 1, and will not be repeated here.

The technical content and technical features of the present disclosure have been disclosed above, but those skilled in the art may still make various substitutions and modifications based on the teachings and disclosures of the present disclosure without departing from the spirit of the present disclosure. Therefore, the scope of protection of the present disclosure should not be limited to the content disclosed in the embodiment(s), and should include various substitutions and modifications that do not deviate from the present disclosure and are covered by the claims of this the present disclosure.

What is claimed is:

1. A remote device, comprising: a remote unit including:
at least one remote frequency conversion processing unit, configured to perform frequency conversion processing or restoration frequency conversion processing on a first signal and output the processed first signal, and the first signal including 5G signal; and
at least one remote non-frequency-conversion processing unit, configured to directly output a second signal without being processed by frequency conversion, the second signal including one or more of 2G signal, 3G signal, or 4G signal,
wherein the at least one remote frequency conversion processing unit comprises at least one 5G remote processing unit, and a 5G remote processing unit of the at least one 5G remote processing unit comprises:
a 5G remote downlink processing unit, configured to perform frequency conversion processing on a 5G downlink radio frequency signal and output the processed 5G downlink radio frequency signal to a first switching unit,
a 5G remote uplink processing unit, configured to restore frequency conversion processing on the 5G uplink radio frequency signal transmitted by the first switching unit and output the restored signal, and
the first switching unit, configured to switch the uplink and downlink radio frequency signals.

2. The remote device according to claim 1, wherein each of the 5G remote downlink processing unit and the 5G remote uplink processing unit comprises a 5G converter and a 5G adjustment unit connected to the 5G converter, the 5G adjustment unit of the 5G remote downlink processing unit is connected to the first switching unit, and the 5G converter of the 5G remote uplink processing unit is connected to the first switching unit.

3. The remote device according to claim 2, wherein the 5G remote downlink processing unit further comprises a synchronization module, the synchronization module includes a coupler and a synchronization unit, and the coupler is connected to the 5G converter of the 5G remote downlink processing unit, one end of the synchronization unit is connected to the coupler, and the other end of the synchronization unit is connected to the first switching unit, the coupler is configured to couple 5G downlink signals to the synchronization unit to control the first switching unit.

4. The remote device according to claim 2, wherein the 5G converter of the 5G remote downlink processing unit and the 5G converter of the 5G remote uplink processing unit are both connected to a same frequency providing unit configured to provide a local oscillator frequency, or respectively connected to different frequency providing units configured to provide the local oscillator frequency.

5. The remote device according to claim 2, wherein the 5G adjustment unit comprises a 5G remote first amplifier, a 5G remote second amplifier, and a first signal adjuster connected between the 5G remote first amplifier and the 5G remote second amplifier connected in series in sequence.

6. The remote device according to claim 1, wherein the non-frequency-conversion processing unit includes any combination of one or more 4G remote processing units, one or more 3G remote processing units, or one or more 2G remote processing units, and each of the 4G remote processing units, the 3G remote processing units, and the 2G remote processing units includes a remote downlink processing unit, a remote uplink processing unit, and a second switching unit, and the remote downlink processing unit is configured to perform frequency conversion processing on the downlink second signal and output the processed downlink second signal to the second switching unit, the remote uplink processing unit is configured to restore frequency conversion processing on the uplink second signal transmitted from the second switching unit and output the restored signal, the second switching unit is configured to switch the uplink and downlink second signals.

7. The remote device according to claim 1, wherein the remote device further comprises a first transmission module and a first multi-frequency combiner, the first transmission module is connected to one end of the remote unit to transmit radio frequency signals, the first multi-frequency combiner is connected to the other end of the remote unit to split or combine the radio frequency signals.

8. The remote device according to claim 7, wherein the remote device further comprises a remote power supply unit configured to supply power to the remote unit, the remote power supply unit is connected to the first multi-frequency combiner.

9. The remote device according to claim 8, wherein the remote supply unit is disposed outside the remote unit.

10. The remote device according to claim 8, wherein the remote supply unit is integrated in the remote unit.

11. The remote device according to claim 9, wherein the remote device further comprises a passive network unit, and the passive network unit is connected to the remote supply unit.

12. The remote device according to claim 9, wherein the first switching unit and the second switching unit are implemented by radio frequency switches and/or duplexers.

13. The remote device according to claim 10, wherein the remote device further comprises a passive network unit, and the passive network unit is connected to the first multi-frequency combiner.

14. A 5G distributed system, comprising:

a near-end unit, a remote device connected to the near-end unit and comprising:

at least one remote frequency conversion processing unit, configured to perform frequency conversion processing or restoration frequency conversion processing on a first signal and output the processed first signal, and the first signal including 5G signal; and at least one remote non-frequency-conversion processing unit, configured to directly output a second signal without being processed by frequency conversion, the second signal including one or more of 2G signal, 3G signal, or 4G signal, and an active antenna unit connected to the remote device and configured to:

perform restoration frequency conversion processing on the first signal output by the remote device and output the restored signal to an antenna, or perform frequency conversion processing on the first signal input from the antenna and output the processed first signal to the remote device, and directly output the second signal received from the antenna or received from the remote device without performing frequency conversion, wherein the at least one remote frequency conversion processing unit comprises at least one 5G remote processing unit, and a 5G remote processing unit of the at least one 5G remote processing unit comprises;

a 5G remote downlink processing unit, configured to perform frequency conversion processing on a 5G downlink radio frequency signal and output the processed 5G downlink radio frequency signal to a first switching unit, a 5G remote uplink processing unit, configured to restore frequency conversion processing on the 5G uplink radio frequency signal transmitted by the first switching unit and output the restored signal, and the first switching unit, configured to switch the uplink and downlink radio frequency signals.

15. The 5G distributed system according to claim 14, wherein the active antenna unit comprises a second multi-frequency combiner, at least one active frequency conversion processing unit and at least one antenna, and the second multi-frequency combiner is connected to the remote device, and the at least one antenna is indirectly connected to the second multi-frequency combiner through the active frequency conversion processing unit, and is directly connected to the second multi-frequency combiner, the first signal transmitted from the remote device is processed by the active frequency conversion processing unit and then output to one or more antenna of the at least one antenna, and the second signal transmitted from the remote device is directly output from one or more antenna of the at least one antenna without being processed by frequency conversion.

16. The 5G distributed system according to claim 15, wherein the active frequency conversion processing unit includes a first switch, an active downlink processing unit, an active uplink processing unit, and a second switch, the first switch is connected to the second multi-frequency combiner, the active downlink processing unit and the active uplink processing unit are connected in parallel between the first switch and the second switch, and the second switch is connected to the antenna.

\* \* \* \* \*